3,734,870
PREPARATION OF FOAMED BODIES USING
A UREA BLOWING AGENT
Gunter Schroeder, Ober-Ramstadt-Eiche, and Wolfgang Gaenzler, Darmstadt, Germany, assignors to Rohm G.m.b.H., Darmstadt, Germany
No Drawing. Continuation-in-part of application Ser. No. 758,695, Sept. 10, 1968. This application June 17, 1971, Ser. No. 154,159
Claims priority, application Germany, Sept. 16, 1967, R 46,928
Int. Cl. C08f 27/08, 47/10; B29d 27/00
U.S. Cl. 260—2.5 N                                8 Claims

ABSTRACT OF THE DISCLOSURE

A two-step method for preparing shaped foamed bodies from a plastic comprising a urea blowing agent and a copolymer including acrylic or methacrylic acids and their amides or nitriles which comprises first heating the unconfined plastic to foam it partially and then foaming it further by heating at a higher temperature while the plastic is confined.

---

This application is a continuation-in-part of copending application Ser. No. 758,695, filed Sept. 10, 1968, now abandoned.

The present invention relates to the preparation of shaped foamed bodies, and relates in particular to a two-step foaming process for preparing such foamed bodies in which an unconfined synthetic resin forming cross-links when heated is partially foamed by heating in a first step, using urea or dimethylurea as the foaming agent, and the cross-linked partially foamed material so formed is then foamed further in a second step at a higher temperature, while confined, to form the final product.

Canadian Pat. 591,621 to McMillan et al. teaches a cyclic foaming method in which a thermoplastic resin mass is repeatedly foamed by heating to a temperature above the softening point of the resin, cooling, and reheating. The mass, on first foaming, contains a primary, normally gaseous, blowing agent of low permeability to the resin, generally a halohydrocarbon gas. This gas largely remains in the foam cells during the cyclic foaming. After foaming, the resin is cooled in the presence of a secondary blowing agent to which the resin is highly permeable, specifically a lower molecular weight gas such as air, helium, nitrogen, or carbon monoxide. The secondary agent permeates the foam, raising the pressure of the combined gases (primary and secondary blowing agents) to values which, on further heating, suffice to foam the resin further.

The process of the present invention differs in at least two respects from the cyclic foaming process of this Canadian patent.

First, it employs, as the resin being foamed, a material forming internal cross-links on heating: that is, a material which loses thermoplasticity during foaming and which could not repeatedly be foamed as in the McMillan method. Indeed, whereas that method may bring about a volume change in a thermoplastic treated thereby from one part to as many as 150 parts in 9 foaming steps (14,900 percent volume increase), the volume increase in the second foaming step of the present invention does not exceed a change from 3 parts to 4 parts (33 percent increase).

Second, it employs as the foaming agent a normally solid (not gaseous) material which, on heating, forms a gas, one principal part of which (ammonia) reacts with the resin being foamed to form internal cross-links reducing resin thermoplasticity and a second principal part of which is carbon dioxide, acknowledged by McMillan et al. to be sufficiently permeable as to be a "secondary" blowing agent in his process. The solid blowing agent used in the present invention would be expected to be fully—and irreversibly—decomposed during the first heating step of the two-step heating process with the formation of gases largely removed from the resin by reaction or diffusion. Hence, it is surprising that any further foaming can be carried out according to the present invention, since the blowing mechanism is evidently quite different from that taught by McMillan et al.

Finally, the foamed products prepared according to the present invention using a two-step foaming process differ in their properties from the same resins foamed in a single stage. First, the resins foamed in two stages have an increased resistance to compression. Further, the foamed materials of the invention show more uniform shrinkage on extended exposure to high temperatures. For example when the foamed bodies are used as insulation on hot air or hot water conduits in the form of paired semicylindrical jackets, uniform shrinkage less readily exposes bare portions of the insulated body along the seam lines of the insulator.

The resins which are foamed according to the present invention are copolymers comprising from 10 to 90 percent by weight of (A) acrylic acid or methacrylic acid, the balance being (B) an amide or nitrile of acrylic acid or methacrylic acid, i.e. in an amount of from 90 to 10 percent by weight. However, the copolymers may optionally comprise up to 30 or 40 percent by weight of (C) one or more other vinyl or vinylidene comonomers, in which case the balance of the copolymer comprises more than 10 percent, but less than 90 percent, of each of (A) and (B), the sum of the weight percentages of all components totalling 100 percent of the weight of the copolymer.

Preferred compositions are those in which (A) is methacrylic acid present in an amount from 45 to 90 percent by weight, (B) is methacrylonitrile present in an amount from 10 to 55 percent by weight, and (C) is optionally present in amounts up to 30 percent by weight, with the sum of (A), (B), and (C) again totalling 100 percent.

Typical unsaturated copolymerizable vinyl and vinylidene compounds (C) include the lower alkyl esters of acrylic and/or methacrylic acid, styrene and its homologs, vinyl esters, vinyl chloride, α-methylene-glutaronitrile, and maleic acid anhydride. For the achievement of special effects, minor quantities of polymerizable heterocyclic compounds such as vinyl pyridine or N-vinyl pyrrolidone, as well as esters of acrylic or methacrylic acids having substituted alkyl groups such as hydroxyalkyl esters and dialkylamino alkyl esters, can also be present.

Compounds with two or more reactive groups in the molecule can be incorporate in minor amounts for cross-linking purposes. Thus, compounds containing two or more vinyl groups, such as ethylene glycol dimethacrylate, divinyl benzene, triallyl cyanurate, allyl acrylate, and diallyl phthalate, can be suitably incorporated in amounts of from 0.1 to 2 percent. Compounds which contain one or more amide-methylol, amidemethylol ether, carbamide-methylol, carbamide-methylol ether, or epoxy groups in addition to at least one vinyl or vinylidene group can be present in amounts of up to 10 percent of the foamable plastic. Such cross-linking agents include, for example, N-(isobutoxymethyl) - methacrylamide, N - methylolacrylamide, dimethylolurea, hexamethylol-melamine hexamethyl ether, glycidyl acrylate, glycidyl methacrylate, and diepoxides prepared from bisphenol A and epichlorohydrin.

At least 5 parts, and up to 30 parts, of urea or dimethylurea are combined as a blowing agent with 100 parts by weight of such a copolymer prior to the first foaming step. When urea is used as the blowing agent, suitably up to 20 parts by weight are used per 100 parts of copolymer; when dimethylurea is used, it may suitably be present in amounts up to 30 parts per 100 parts by weight of the copolymer.

Copolymers of this kind are known in the art and have also heretofore been foamed with urea—in a one-step process, however—to form shaped foamed bodies. Thus, both French Pat. 1,433,673 and British Pat. 1,045,229 teach foamed bodies prepared by heating a copolymer formed between acrylic acid or methacrylic acid and acrylamide, methacrylamide, acrylonitrile, or methacrylonitrile, and further optional comonomers, which copolymer contains a blowing agent, chiefly urea. As mentioned earlier herein, on heating, urea decomposes completely in the presence of water to form carbon dioxide and ammonia. The ammonia functions not only as a blowing gas but also reacts with the acid groups of the polymer (or with anhydride groups which are intermediately formed therefrom) to produce amide groups in the copolymer. In turn, the latter very quickly form cyclic or linear imide groups of the structure —CO—NH—CO— with further anhydride, carboxyl, or amide groups of the polymer at temperatures over 150° C. The water necessary for the decomposition of urea to ammonia and carbon dioxide is released by this condensation reaction. If these imide groups are linear, they effect cross-linking between different polymer molecules. As a result of this, the foaming of such polymers is accompanied by a loss of thermoplasticity.

As a further result of this cross-linking, on the one hand, and of the formation of cyclic acrylimide or methacrylimide groups, on the other hand, the above-mentioned foamed bodies characteristically have a high resistance to corrosive agents and to deformation by heat. However, the art has not heretofore been able fully to utilize the excellent physical properties of these foamed resins because of the limitations of one-step foaming processes in forming shaped bodies. For example, in the preparation of plane foam sheets from polymer sheets, differences in thickness of the foamed plate regularly appear if the material is free-foamed, i.e. without confinement, in a mold. These are attributed to local irregularities in the temperature and rate of heating. In order to form foamed sheets of uniform thickness from such materials, the sheets must be abraded on both sides. In contrast, if the plastic sheet is foamed in a mold having a cavity corresponding to the thickness of the foamed sheet to be produced, it becomes warped in the early stages of foaming and presses here and there against the walls of the mold, considerably hindering its own expansion through the length and the breadth of the mold. The sheet has the tendency to "grow around" these sticking points, and in this way develops cracks and creases.

Further, it is not possible by foaming directly to produce sheets of irregular shape, such as are commonly used in practice. Most often, these must be cut from foamed sheets formed as semi-finished products, thus giving rise to high labor costs and the production of useless scrap. This disadvantage can be avoided, of course, by heating granules of the formable plastic in a foam mold having a cavity of the form of the foamed piece to be produced. However, if a foamed body of uniform thickness is to be produced by this method, the granules must be distributed in the mold in a layer of uniform thickness overall, since the foaming material flows very little. In industrial practice, this causes great difficulties.

These difficulties are avoided according to the process of the present invention, according to which a copolymer of the kind earlier described, containing a solid blowing agent, is first prepared, as a rule by polymerization in bulk. The process described in German patent publication 639,095, in which the polymerizable mixture is warmed in a flat mold formed by glass plates and a sealing strip therebetween, is particularly adaptable for the preparation of plastics in sheet form for further treatment according to the process of the present invention.

The plastic formed in this manner, or formed in another manner (for example by polymerization in a plastic-film pouch) can be broken into granules. In the unfoamed condition, the particle size should not be less than 2 to 3 millimeters in diameter. Particularly uniform and light foams are obtained when material smaller than 2 to 3 millimeters in diameter is removed by sieving.

In the first foaming stage, the plastic granules are heated in an unconfined state, without application of pressure. In this stage, temperatures of 150° C.–200° C. are preferably employed for from 0.5 to 30 minutes, but the process of the invention is not limited to these times and temperatures. Heating can be by conduction, radiation, the use of hot air or flame gases, or by using hot liquids. The granulate can be treated in metal baskets, ovens having racks or shelves, or the like. However, in large-scale production a continuous process is preferred: for example, heating on an endless belt that passes through a tunnel having one of the aforementioned heating devices, or heating in a fluidized bed employing hot gases. The latter at the same time has the advantage that the already-foamed material can be selectively removed because of its decreased density. High frequency heating permits the use of extremely short heating times.

The resulting foamed product can be foamed further in the second step of the process of the invention without or with intermediate cooling. For example, for the preparation of foamed bodies in the form of sheets according to the process of the present invention, it has proved convenient to carry out the first stage of the foaming process in the hollow mold to be used for the final foaming, but without confinement, e.g. with the mold not yet completely closed. A particularly economical and rapid preparation is possible when the hollow mold is closed immediately after conclusion of the first foaming step and is then heated, without an intermediate cooling period, to completely foam the plastic. For continuous processing, the upper and lower parts of the mold may be members on an endless chain which proceeds through different temperature zones.

However, it is also possible to store the prefoamed material obtained in the first stage and to foam it completely at a later time. Such a technique is preferably used if a complicated three-dimensional shape is to be produced, e.g. a tubular half-shell. For this purpose, a granulate is employed whose bulk volume is at least 75 percent, preferably 90 percent, of the volume desired in the final product, that is the mold is filled to three-quarters, preferably nine-tenths, of its volume with the pre-foamed material. Thus, the change in volume of the resin in the second foaming stage does not exceed about 33 percent, preferably not more than 10 or 11 percent, of its original volume.

The final foaming of the granulated or sheeted pre-foamed materials in the second stage takes place with the foamed material under confinement, e.g. in pressure resistant molds provided with openings for the escape of air displaced by the expanding foam. The pressure exerted by the foam on the walls of the mold increases with the desired density of the final product, and can reach values of over 5 kg./cm.$^2$. The molds need not totally enclose the resin: for example, pre-foamed granules are conveniently foamed between parallel plates open at the edges. The slight volume change effected by the second heating is sufficient to produce planar foamed sheets if the pre-foamed granulate is present loosely packed between the plates and touching them.

The temperature during the second foaming step is preferably kept between 170° C. and 300° C. and, critically, is higher than the temperature used in the first foaming step, and heating is for from about 2 minutes to 2 hours, shorter times being used at higher temperatures. Temperatures of about 170° C.–180° C. are particularly useful for plastics having a high proportion of such monomers which neither form cyclic nor linear imide groups, such as styrene or methyl methacrylate, for example. At temperatures of over 300° C., decomposition and discoloration are often encountered. However, certain of the properties of the foam, for example resistance to compression, can be improved by post-heating the material after the second foaming step for an extended period, i.e. one or more hours, at 150° C.–200° C.

A limited quantity of completely foamed material, which may be of the same or of a different composition and which has been subsequently again reduced in size, can be added to the pre-foamed granules to be treated. In this manner, depending on the density of the added material, the density of the final product can be influenced.

The foams obtained have densities between 30 and 300 grams per liter. The high density foams are distinguished by high mechanical strength, particularly resistance to pressure. Particularly low densities, especially for foam granules, are obtained by taking a number of additional measures. These include the use of a starting material with high urea content and the treatment of the granules with water or steam before the first and/or the second heating steps. This treatment leads to a good welding of the granules, and for this reason is also of advantage in the preparation of foamed bodies of higher density. A water content in the starting material of from 0.5 to 10 parts by weight per 100 parts of copolymer has a similar effect.

Although the presence of water does soften the foamed copolymer somewhat, this result is not to be confused with the formation of non-linked copolymers of somewhat similar structure as in German Pat. 1,113,308. In that patent, polymer dispersions containing water in amounts many times exceeding their polymer content are heated to form non-cross-linked solvent-soluble structures. The presence of small amounts of water in the foaming process of this invention does not significantly affect the cross-linking reactions occurring on heating.

Additions of 0.5 to 10 parts by weight of vinyl copolymers, per 100 parts of the polymer-forming starting material, are of special significance. In the preparation of the starting material, these copolymer additives are introduced into the mixture comprising monomer and urea or dimethyl urea. They comprise at least 10 percent by weight of entities of the formula

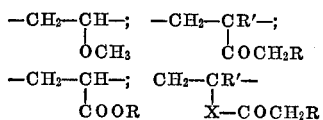

or

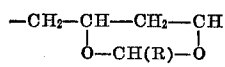

wherein R is hydrogen or alkyl, R' is hydrogen or methyl, and X is one of the groups —O; phenylene; or —CO—O—alkylene—O. The alkyl or alkylene groups preferably are those having no more than 6 carbon atoms. Typical groups of this kind are derived from, for example, vinyl ethers, vinyl ketones, vinyl esters, acrylic acid and its esters, acetylstyrene or acetoxyethyl methacrylate. Copolymers formed between monomers of this type or between these monomers and other unsaturated polymerizable compounds are preferably employed, inasmuch as the monomers, according to kind and amount, assure the solubility of the polymer additive in the monomer mixture. Such other monomers include, for example, methacrylic acid or its lower alkyl esters and hydroxyalkyl esters, vinyl chloride, and styrene and its homologs in amounts up to 85 percent by weight of the copolymer, as well as acrylonitrile, methacrylonitrile, acrylamide, or methacrylamide in minor amounts.

Additions of from five to ten parts of silica gel or asbestos flour to 100 parts of the monomer mixture to be polymerized have an effect similar to that of the polymer additions described above.

A better understanding of the present invention and of its many advantages will be had by referring to the following examples, given by way of illustration.

EXAMPLE 1

A plastic starting material for the preparation of a foam was prepared from the following components by heating for 20 hours at 60° C. and for three hours at 100° C.:

|  | Parts by weight |
|---|---|
| Methacrylonitrile | 44.9 |
| Methacrylic acid | 36.8 |
| Methyl methacrylate | 8.2 |
| N-(isobutoxymethyl) methacrylamide | 0.9 |
| Urea | 4.6 |
| Polyvinyl butyral | 4.5 |
| Dibenzoyl peroxide | 0.2 |

The plastic was broken up and particles having a diameter of less than 2 millimeters were removed by sieving. The granulate obtained was kept in water until it increased in weight by 5 percent. The material was subsequently put into an open wire basket and heated in a warming oven at 180° C. for 15 to 20 minutes. A pre-foamed granulate having a bulk density of 230 kg./m.$^3$ was obtained in this way.

A mold having a cavity in the shape of a tubular half-shell was preheated to 250° C., completely filled with the pre-foamed granulate, and heated for 45 minutes at 250° C. Thereafter, the material was post-heated for 75 minutes at 180° C. After cooling, a yellow-brown foam in the form of a tubular half-shell and having a density of 200 kg./m.$^3$ was removed from the cavity.

EXAMPLE 2

The following mixture was polymerized under the same conditions as in Example 1 to form a foamable plastic which was then broken and sieved to give a granulate having a minimum particle size of 2.5 millimeters.

|  | Parts by weight |
|---|---|
| Methacrylonitrile | 24.6 |
| Methacrylic acid | 57.0 |
| Urea | 12.3 |
| Polyvinyl butyral | 4.8 |
| Water | 1.1 |
| Dibenzoyl peroxide | 0.2 |

The granulate was pre-foamed by heating at 175° C.–180° C. for 7 to 10 minutes to have a bulk density of 110–125 kg./m.$^3$. During the course of 12–18 hours' storage at 50° C. and 100 percent relative humidity, the material absorbed 3 to 4 percent by weight of water. A hollow mold pre-heated to 250° C. was filled about ¾ full with the pre-foamed granulate. The closed mold was then heated for 40 to 45 minutes at 250° C. and subsequently heated at 180° C. for 75 minutes. A fine-pored white foam having a density of 80–90 kg./m.$^3$ was obtained.

EXAMPLE 3

A plastic sheet one centimeter thick and comprising 98 parts of a copolymer of methacrylonitrile and methacrylic acid in a weight ratio of 30:70, 5 parts of urea, and 5 parts of polyvinyl butyral, was heated unconfined in a warming oven at 180° C. for 15 minutes. Subsequently, the pre-foamed sheet was heated for 30 minutes at 200° C. and for 75 minutes at 180° C. in a hollow mold having a cavity about 2.7 times as large in length, breadth, and height respectively as the original plastic sheet. The cavity became completely filled. The foam obtained had a density of 60 g./l.

EXAMPLE 4

A rectangular plate one centimeter thick of a plastic comprising 5 parts by weight of urea and 95 parts of a copolymer of methacrylic acid, acrylamide, and α-methyl glutaronitrile in a weight ratio of 45:55:10, was heated unconfined in a hot air warming oven for 10 minutes at 180° C. A slightly corrugated foam sheet having a density of 120 kg./m.³ was obtained in this way. The pre-foamed sheet was subsequently heated in a closed rectangular mold for 35 minutes at 200° C. and for a further 60 minutes at 180° C. The mold was completely filled and a foamed sheet having a density of 96 kg./m.³ was obtained.

EXAMPLE 5

A polymer obtained by heating a mixture of 50 parts by weight of acrylamide, 25 parts by weight of acrylic acid, 11.8 parts by weight of styrene, 14.3 parts by weight of maleic acid anhydride, 5.75 parts by weight of urea, and 0.5 part by weight of azo isobutyronitrile for 40 hours at 40° C., with subsequent tempering for three hours at 100° C., was broken up to form a granulate having a particle diameter of 2–3 mm.

This granulate was blown up by 20 minutes' heating at 160° C. to form a pre-foamed granulate having a bulk density of about 72 kg./m.³.

If the cavity of a mold pre-heated to 210° C. is almost completely filled with this pre-foamed granulate, a foamed body having a density of 68 kg./m.³ is obtained after 20 minutes' heating at 210° C.

EXAMPLE 6

The pre-foamed granulate of Example 5 having a bulk density of about 72 kg./m.³ was kept for 20 hours at 50° C. at a relative humidity of 100 percent.

If the cavity of a mold pre-heated to 210° C. is almost completely filled with this material, it foams when heated for 40 minutes at 210° C. to form a corresponding foamed body having a density of only 60 kg./m.³. The foam is almost colorless and the individually foamed particles are very well welded to one another.

EXAMPLE 7

A foamable plastic is obtained by polymerizing a mixture of

| | Parts by weight |
|---|---|
| Methacrylonitrile | 30.5 |
| Methacrylic acid | 69.5 |
| N,N'-dimethyl urea | 15 |
| Water | 2.5 |
| Dibenzoyl peroxide | 0.2 | by warming the mixture for 25 hours at 60° C. and for three hours at 100° C. in a polyester film bag. The polymer is broken up and granules having a particle size of from 2 to 3 millimeters are isolated by sieving. These granules foam on being heated for 12 minutes at 185° C. to form pea-sized kernels having a bulk density of about 85 grams per liter.

A hollow mold pre-heated to 230° C. was completely filled with this pre-foamed material, closed, and heated for 45 minutes at 230° C. and for 75 minutes at 170° C. After cooling, a light-colored shaped body having a density of about 80 grams per liter was removed.

EXAMPLES 8–14

Batches of a mixture comprising

| | Parts by weight |
|---|---|
| Methacrylonitrile | 45 |
| Methacrylic acid | 55 |
| Urea | 10 |
| Water | 2 |
| Dilauryl peroxide | 0.2 | are polymerized to form a foamable plastic by heating for 22 hours at 55° C. and for three hours at 100° C. after the addition of the materials shown below in Table I.

The material is granulated in each case and those portions having an average particle size of less than 2 millimeters are removed. The granulate obtained in this fashion is expanded in a first step by heating for 10 to 15 minutes at 190° C. to form pre-foamed grains having the bulk density given in Table I.

In a second step, the cavity of a mold pre-heated to 235° C. is filled with pre-foamed granulate, held for 25 minutes at this temperature, and then heated for an additional hour at 175° C. After cooling, shaped bodies having the density given in the table are obtained.

TABLE I

| Example | Additive | Parts by weight | Bulk density after first stage (g./l.) | Density after second stage (g./l.) |
|---|---|---|---|---|
| 8 | Silicic acid aerogel | 7 | 95 | 90 |
| 9 | Asbestos flour and silicic acid aerogel (1:1 by weight) | 10 | 140 | 135 |
| 10 | Copolymer of β-acetoxymethacrylate and methylmethacrylate (20:80 by weight) | 3 | 95 | 90 |
| 11 | Copolymer of acetylstyrene and methylmethacrylate (30:70 by weight) | 3 | 130 | 125 |
| 12 | Copolymer of methyl vinylketone and methylmethacrylate (40:60 by weight) | 2 | 140 | 135 |
| 13 | Copolymer of vinyl acetate and vinyl chloride (40:60 by weight) | 4 | 170 | 165 |
| 14 | 40% Dispersion of a copolymer of ethylacrylate and methylmethacrylate (15:85 by weight) | 4 | 140 | 135 |

What is claimed is:

1. In the method making a shaped foamed body by heating, to a temperature of at least 150° C., a resin composition comprising at least 5 parts by weight of urea or dimethylurea as a blowing agent and 100 parts by weight of a first copolymer of (A) acrylic acid or methacrylic acid in an amount from 10 to 90 percent by weight of said copolymer; (B) an amide or nitrile of acrylic acid or methacrylic acid in an amount from 10 to 90 percent by weight of said copolymer; and (C) at least one vinyl or vinylene monomer, copolymerizable with (A) and (B) and different from (A) and (B), in an amount from 0 to 40 percent by weight of said copolymer, the sum of percentages of (A), (B), and (C) totalling 100 percent; said copolymer rapidly forming cross-linking imide groups at a temperature of 150° C. or more by reaction of ammonia, irreversibly released by thermal decomposition of said blowing agent, with acid groups of component (A) to form amide groups and by further reaction of these amide groups with other acid groups of component (A), the improvement of foaming said resin composition in two steps by:

(1) first heating said composition, while unconfined, to a temperature from about 150° C. to 200° C. to form a prefoamed cross-linked intermediate; and (2) then heating said pre-foamed intermediate, while confined, in a pressure resistant mold to a temperature from about 170° C. to 300° C., said temperature being greater than the temperature in said first heating step.

2. The method as in claim 1 wherein the volume of said foamed body after the second heating step does not exceed about one-third the volume of the pre-foamed cross-linked intermediate prior to said second heating.

3. The method as in claim 1 wherein said component (C) is a lower alkyl acrylate or methacrylate, styrene, α-methylene glutaronitrile, or maleic acid anhydride.

4. The method as in claim 1 wherein said resin composition is granulated prior to foaming.

5. The method as in claim 1 wherein said resin composition is additionally post-heated for at least one hour at about 150° C. to 200° C., after said second heating and foaming step.

6. The method as in claim 1 wherein said resin composition additionally comprises about 0.5 to 10 parts by weight of a second copolymer including at least 10 percent by weight of units having at least one formula selected from the group consisting of

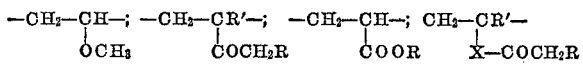

and

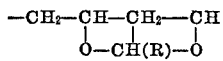

wherein R is hydrogen or alkyl, R' is hydrogen or methyl, and X is —O—, phenylene, or —CO—O—alkylene—O—.

7. The method as in claim 1 wherein said resin composition additionally comprises about 5 to 10 parts by weight of silica gel or asbestos flour.

8. The method as in claim 1 wherein said resin composition additionally comprises from about 0.5 to 10 parts by weight of water.

References Cited

UNITED STATES PATENTS 3,489,700  1/1970  Kanai et al. _____ 260—2.5 N
3,468,820  9/1969  Buchholz et al. _____ 260—2.5 B JOHN C. BLEUTGE, Primary Examiner W. J. BRIGGS, Sr., Assistant Examiner U.S. Cl. X.R.

260—2.5 B, 80.73, 80.8, 80.81, 881, 885; 260—883, 886; 264—55